United States Patent

Moorman et al.

Patent Number: 5,788,040
Date of Patent: Aug. 4, 1998

[54] METHOD AND APPARATUS FOR DETERMINING AND CONTROLLING TORQUE INDUCED ROTATION

[75] Inventors: Steven Patrick Moorman, Dexter; William Robert Mayhew, Ann Arbor, both of Mich.

[73] Assignee: General Motors Corporation, Detroit, Mich.

[21] Appl. No.: 801,430

[22] Filed: Feb. 18, 1997

[51] Int. Cl.$^6$ .................................................. F16D 43/24
[52] U.S. Cl. ........................................ 192/103 C; 477/116
[58] Field of Search .......................... 192/103 C, 103 R, 192/103 F, 109 F; 477/116, 117; 192/52.1, 52.4

[56] References Cited

U.S. PATENT DOCUMENTS

| | | | |
|---|---|---|---|
| 4,924,983 | 5/1990 | Katayama et al. | 192/52.4 |
| 5,351,577 | 10/1994 | Ando et al. | 477/116 |
| 5,450,768 | 9/1995 | Bulgrien et al. | 192/103 C X |
| 5,588,515 | 12/1996 | Toyama et al. | 192/109 F X |

Primary Examiner—Rodney H. Bonck
Attorney, Agent, or Firm—Donald F. Scherer

[57] ABSTRACT

A torque transmitting rotating body in the vehicle has a desired rotational direction during vehicle travel in response to an operator demand. Rotation of the body is determined by a speed sensor which provides a signal to a control system. The control system determines the direction of rotation from consecutive speed signals and a known input torque. The control then issues the appropriate commands to ensure the direction of rotation of the body is in accordance with the operator demand.

2 Claims, 3 Drawing Sheets

METHOD AND APPARATUS FOR DETERMINING AND CONTROLLING TORQUE INDUCED ROTATION

TECHNICAL FIELD

This invention relates to transmission controls wherein the direction of rotation of a body is evaluated.

BACKGROUND OF THE INVENTION

Rotational direction is determined by expensive and/or complex devices, such as optical encoders. These devices are generally not utilized in conventional passenger vehicles due to the expense and space requirement. The rotational direction of a body, particularly in a passenger vehicle, can be useful during "garage shifts", hill launch or vehicle deceleration. The lack of a directional signal can be overcome by applying an increased control force to the active friction device if the desired response does not occur within a predetermined time. This solution, while effective, can increase the engagement slip time of the activated friction device.

SUMMARY OF THE INVENTION

It is an object of the present invention to provide an improved control system wherein the direction of the rotating body of a vehicle is determined and controlled.

In one aspect of this invention, consecutive rotary speeds of a clutch output are measured to determine if the acceleration is positive or negative relative to the applied torque. The clutch pressure is controlled in accordance with the determined acceleration. The apply pressure at the clutch may continue at the design ramp rate or be increased to a rate other than the design ramp as indicated by the acceleration value and the applied torque.

DESCRIPTION OF THE PREFERRED EMBODIMENT

Figure 1:
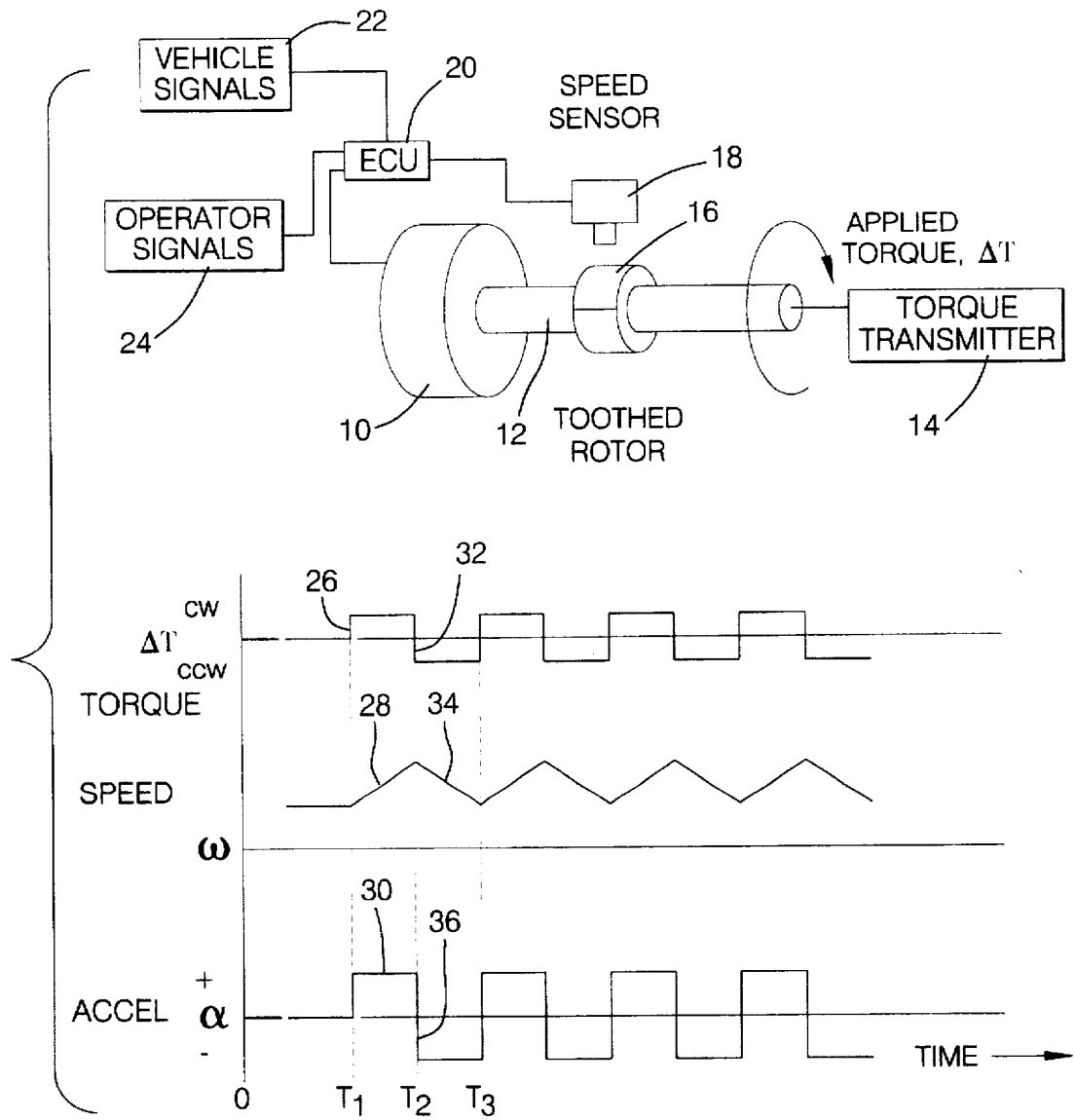
FIG. 1 is a schematic and graphic representation of a drive system incorporating the present invention.

Referring to the drawings, there is seen in FIG. 1 a rotating body 10 driven by a shaft 12 from a torque transmitting device 14. The shaft 12 has disposed thereon a toothed rotor 16. Adjacent to the toothed rotor 16 is mounted a conventional speed sensor 18. The speed sensor 18 provides speed signals to an electronic control unit (ECU) 20 which may incorporate a multi-purpose preprogrammed digital computer. The ECU 20 also receives vehicle signals 22 and operator signals 24.

The torque transmitting device 14 can include a small electric motor or other limited power source capable of imposing a slight differential torque. This will result in acceleration, either positive or negative, depending on the direction of rotation and the direction of the differential torque. In FIG. 1, the direction of torque application is shown as clockwise and is considered for this disclosure to be in the positive direction. As noted in the graph, the differential torque can be clockwise or counterclockwise thereby affecting the acceleration of the body 10.

The vehicle signals 22 can include vehicle speeds, engine speeds, the operating condition of the transmission, and a number of other signals that are available from conventional vehicles. The operator signals can include the operator manual input to the transmission, the operator setting of either brake or accelerator pedal, among other operating devices.

The speed sensor 18 detects the rotary speed of the shaft 12. As seen in the lower half of FIG. 1, as the graphic representation of what occurs with these speed signals. From zero to time T1, the torque input is constant as is the speed and the acceleration is zero. At time T1, a differential torque 26 is applied to the shaft 12 resulting in a speed signal increase 28. The speed signal is sensed as acceleration 30. The speed signal 28 is conducted to the ECU 20 in each loop of the processor within the ECU such that consecutive speed signals are recorded and the acceleration between the speed signals is determined.

From time T2 to time T3, in FIG. 1, a negative differential torque 32 is applied which results in a decrease in speed 34 and a negative acceleration or deceleration 36. The ECU 20 is given this information such that the proper control signals can be given to the rotating body 10 so that the desired rotational direction is maintained.

Figure 2:
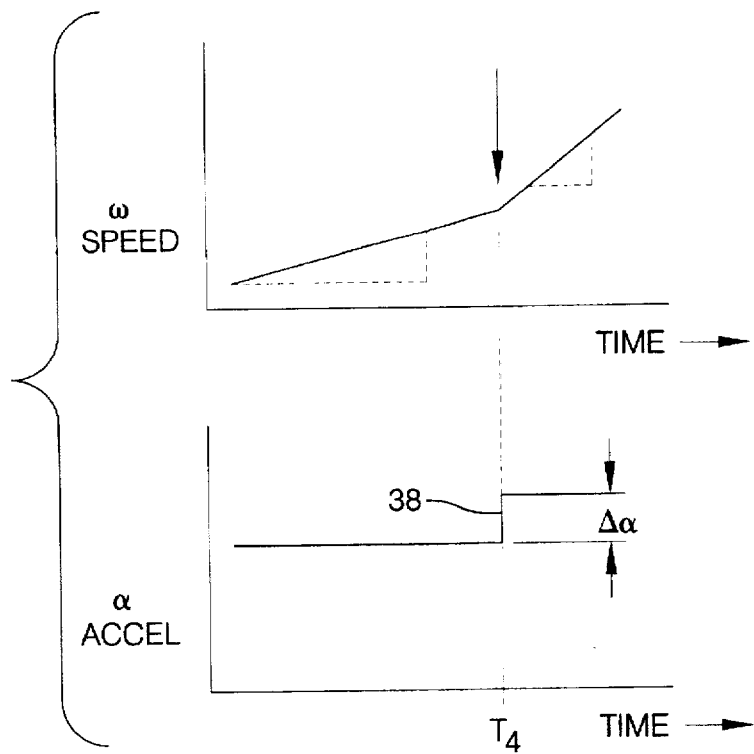
FIG. 2 is a graphic representation of operating parameters versus time for a rotating body.
Figure 3:
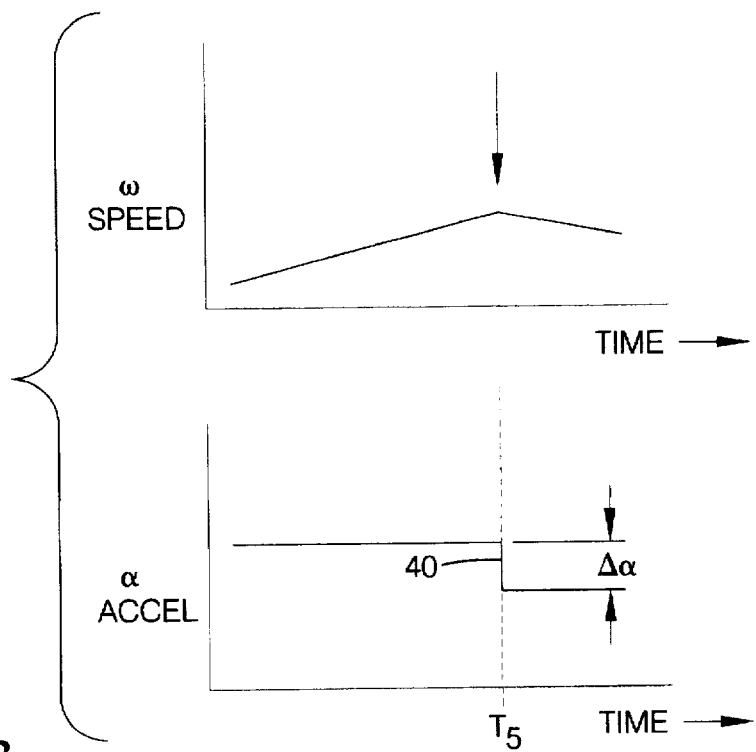
FIG. 3 is a graphic representation similar to FIG. 2.

FIGS. 2 and 3 represent the relationship between acceleration and speed, which is, of course, well known. In FIG. 2, the acceleration is constant from zero to time T4 at which time is increased by a differential amount 38. The corresponding speed value from zero to time T4 increases along a slope equal to the acceleration up until point T4, after which, with the increased acceleration the speed increases at a greater rate. This suggests that both the speed and torque change which is required for acceleration are in the same direction.

In FIG. 3, the acceleration is again constant from zero to time T5, at which time it is decreased by an amount 40. During the time from zero to T5, the curve again is constantly increasing while after the change in acceleration, the speed value decreases relative to time. This decrease in speed suggests that the acceleration and therefore the torque value are in a direction opposite to the speed value.

Figure 5:
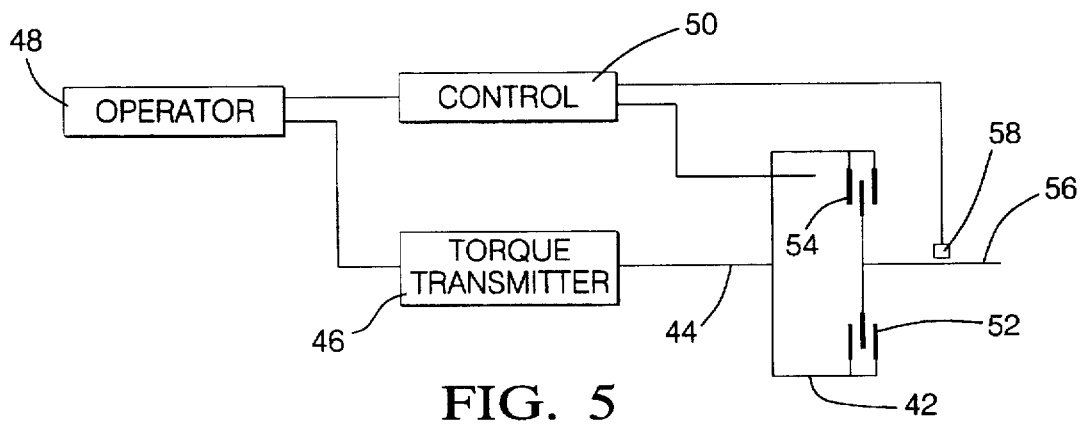
FIG. 5 is a schematic representation of a drive train utilizing the algorithm of FIG. 4.
Figure 4:
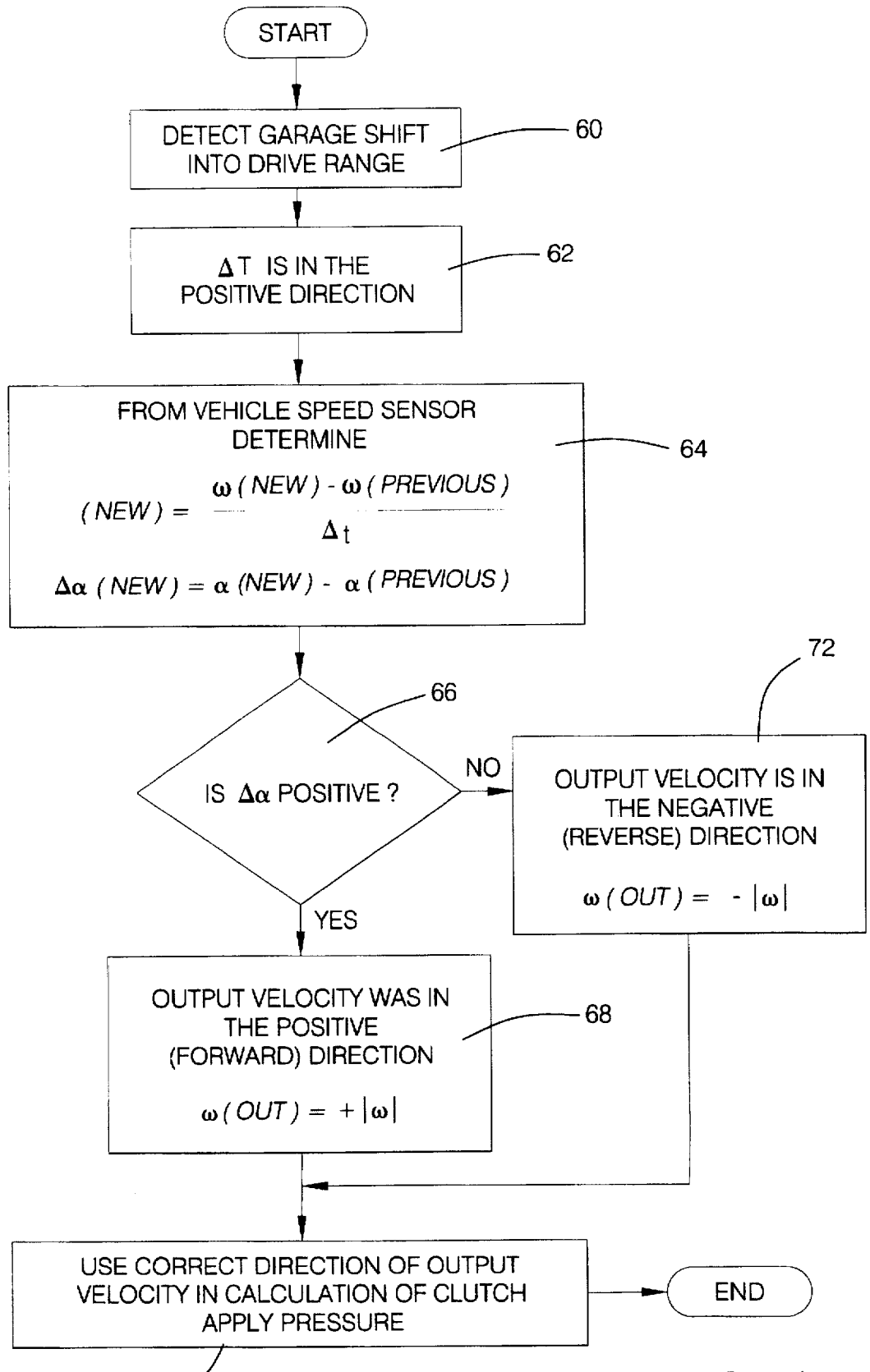
FIG. 4 is an algorithm incorporating one embodiment of the invention.

FIG. 4 is an algorithm which may be utilized to detect the garage shift in a vehicle. In a garage shift, it is well known that the operator is moving the manual control lever from neutral to drive or from reverse to drive in order that the vehicle may be caused to accelerate in the forward direction. FIG. 5 is a schematic representation of a portion of a transmission which involved in a garage shift.

In FIG. 5, there is seen a clutch hub 42 driven by a shaft 44 which is connected with a torque transmitter 46. The torque transmitter 46 might be a conventional torque converter, a frictionally engaged clutch or an engine. The torque transmitter is controlled by an operator 48 and a control system 50 which will incorporate an ECU, such as 20, shown in FIG. 1. The clutch hub 42 has spaced friction plates 52 which are interleaved with friction plates 54. The friction plates 54 are connected with a clutch output shaft 56 which is generally connected to a transmission output shaft or planetary gearing to control the output speed of the transmission. A speed sensor 58 measures the output speed of the clutch shaft 56. The control 50 might also measure the input speed of the clutch hub or housing 42.

During a garage shift, the control 50 directs fluid pressure to the piston, not shown, of the clutch to cause frictional engagement of the plates 54 and 52. This will result in rotation of the shaft 56 assuming that the shaft 42 is being rotated by the torque transmitter.

In FIG. 4, an algorithm to detect the direction of rotation and to cause the proper clutch pressure is depicted. The algorithm at block 60 detects that a garage shift is in effect, that is, there has been a movement of the operator control from neutral to drive. In block 62, it is determined that the engine or the prime mover is operating in the positive direction and therefore the torque applied is in the positive direction. In block 64, the control 50 accepts consecutive readings from the vehicle speed sensor 58 and determines the acceleration as a result of the most recent speed detection and the immediately preceding speed detection divided by the time differential between these speed detections.

The control 50 also stores consecutive acceleration values such that the new acceleration can be determined by evaluating the most recent acceleration value minus the previous acceleration value. This information is passed to a decision block 66 where the control determines whether the acceleration is positive or negative. If the acceleration is positive, the signal is passed on to a block 68 which determines if the velocity is in the positive direction or in the desired direction as requested by the operator. This information is then passed to block 70 which permits the control 50 to provide the appropriate clutch apply pressure to the piston, such that the plates 52 and 54 are frictionally engaged at the desired engagement rate.

If the decision at block 66 indicates that the acceleration is not positive, that is, the velocity is in a direction opposite to that required by the input torque, the block 72 provides appropriate information to the block 70, such that the proper corrections can be made to the clutch apply pressure. Having made these corrections, the algorithm is passed back to a main algorithm which controls the operation of the vehicle and transmission.

It is well known in clutch applications, particularly during a garage shift, that the clutch pressure is increased in ramp fashion. That is, the clutch input pressure is provided at a predetermined rising or increasing rate so that the proper clutch engagement can be made and the sensation of the clutch engagement is imperceptive to the operator.

With the present invention, that is what would occur if the decision at block 66 is a "yes" decision. The control under this situation would proceed at its normal function. However, if the decision at block 66 was "no", the clutch pressure ramp value will change accordingly. The "no" value at the block 66 suggests that the vehicle is still moving in reverse and therefore sufficient clutch pressure has not been supplied to halt the vehicle inertia and start the forward progress thereof.

To accomplish this, the clutch pressure as determined by block 70 can be increased significantly to provide sufficient torque capacity to the clutch mechanism to ensure the desired operator condition will be met.

While the algorithm in FIG. 4 has been described to analyze the detection of a garage shift in the proper direction of vehicle travel from a neutral to a forward drive condition, this same analysis can be utilized in an algorithm to determine the proper direction in reverse should the garage shift be in neutral to the reverse position.

A similar algorithm will be apparent to those skilled in the art which can analyze the launch of a vehicle on a hill to determine if the vehicle is moving in the proper direction according to operator selection in the applied torque. For example, if a vehicle is engaged to start up a hill, but the clutch is not engaged sufficiently to cause that upward movement, this can be detected by the acceleration of the output of the clutch and the proper conditions can be set to ensure that the operator condition is met.

Obviously, many modifications and variations of the present invention are possible in light of the above teaching. It is therefore to be understood, that within the scope of the appended claims, the invention may be practiced otherwise than as specifically described.

We claim:

1. Method of determining and controlling a torque induced rotational direction of a body in a vehicle comprising the steps:

a. determine a desired direction request from an operator;

b. determine the rotary speed of the body from a speed sensor;

c. determine an acceleration change of the body from repeated speed determinations;

d. evaluate the torque and acceleration to determine if the body is rotating in the desired direction; and e. apply a control force to the body at a predetermined level to insure the desired direction of rotation is maintained.

2. Apparatus for controlling a torque induced rotational direction of a body in a vehicle comprising:

operator control means for determining a desired performance request from an operator;

sensor means for determining the rotary speed of the body from a speed sensor;

means for determining an acceleration change of the body from repeated speed determinations;

processor means for evaluating the torque and acceleration to determine if the body is rotating as desired from the operator request; and a control mechanism including means for applying a control force to the body at a predetermined level in accordance with the evaluated acceleration to insure the desired request is achieved and maintained.

* * * * *